US007566830B2

(12) United States Patent
Kjerrumgaard

(10) Patent No.: US 7,566,830 B2
(45) Date of Patent: Jul. 28, 2009

(54) ALARM DEVICE AND HOUSING FOR AN ALARM DEVICE

(75) Inventor: Vibeke Kjerrumgaard, Hornbaek (DK)

(73) Assignee: BK Kobenhavn Holding A/S, Holte (DK)

( * ) Notice: Subject to any disclaimer, the term of this patent is extended or adjusted under 35 U.S.C. 154(b) by 265 days.

(21) Appl. No.: 11/534,369

(22) Filed: Sep. 22, 2006

(65) Prior Publication Data

US 2007/0069912 A1 Mar. 29, 2007

Related U.S. Application Data

(63) Continuation-in-part of application No. PCT/IB2005/000719, filed on Mar. 21, 2005.

(30) Foreign Application Priority Data

Sep. 22, 2005 (EP) .................................. 05020659

(51) Int. Cl.
*H02G 15/02* (2006.01)

(52) U.S. Cl. .................................................... 174/74 R

(58) Field of Classification Search ............... 174/74 R, 174/74 A, 135, 136
See application file for complete search history.

(56) References Cited

U.S. PATENT DOCUMENTS 6,317,054 B1 11/2001 Gronstedt et al.
2007/0261875 A1 * 11/2007 Kjerrumgaard ........... 174/74 R

FOREIGN PATENT DOCUMENTS

GB 2290900 1/1996

* cited by examiner

*Primary Examiner*—Chau N Nguyen
(74) *Attorney, Agent, or Firm*—Klein, O'Neill & Singh, LLP

(57) ABSTRACT

An alarm device, including a detector and an alarm responsive to the detector, is contained in a housing adapted to be mounted adjacent to a ceiling. The housing is provided by a hollow body having an upper circumferential edge for facing the ceiling and a lower circumferential edge that defines an aperture into the housing interior. A plurality of elastically bendable, elongate members is disposed in the housing around the aperture to engage the surface of an electrical cord to carry the alarm device.

26 Claims, 2 Drawing Sheets

ALARM DEVICE AND HOUSING FOR AN ALARM DEVICE

CROSS-REFERENCE TO RELATED APPLICATIONS

This application is a Continuation-in-Part of International Application No. PCT/IB2005/000719, filed Mar. 21, 2005, filed as U.S. patent application Ser. No. 10/593,965, and issued as U.S. Pat. No. 7,439,445, the disclosure of which is incorporated herein by reference.

FEDERALLY SPONSORED RESEARCH OR DEVELOPMENT

Not Applicable

BACKGROUND OF THE INVENTION

The present invention relates to an alarm device comprising a housing adapted to be mounted adjacent to a ceiling, said housing including detector means and alarm means responsive to said detector means. The invention further relates to a housing for an alarm device.

Many different types of alarm devices are known, such as smoke, fire, gas and burglary alarms comprising various smoke detectors, gas detectors and infra-red light detectors in combination with different alarm means such as alarm sounder means and alarm lighting means.

The installation of alarm devices in homes and offices has become very important, and much effort is spent on designing good looking devices, which do not detract from the decor. As an example, smoke alarms are very often mounted as a box that is screwed into the ceiling of a room where there is a risk of a fire starting. Although such smoke alarms can be decorative, they are still foreign objects for a living room or an office. Similarly, burglar alarms are mounted as visible foreign objects and it may be undesirable for such alarms to be visible to an intruder.

It would therefore be desirable to have an alarm device that cannot be recognized as an alarm device by a person entering a room.

GB 2 221 074 A discloses a smoke detector device which, in use, forms part of a ceiling light fitting, comprising a housing adapted to be mounted adjacent to a ceiling and having an aperture in a lower-most surface thereof to allow the passage of an electrical flex cord therethrough, said housing enclosing smoke detector means and alarm sounder means responsive to said detector means. The housing can be of dimensions comparable to conventional ceiling rose light fittings, and this prior art smoke detector will not be visible as a smoke detector by a person entering a room where the smoke alarm is built into a ceiling rose light fitting hiding the connection between the cord of a swinging lamp and an AC power outlet in the ceiling surface.

From GB 2 290 900, a lighting smoke alarm is known, which smoke alarm is composed of two parts: a first part to be fixed relative to the ceiling, and a second part constituting a hollow or dome-shaped part to be arrested relative to the first part by means of a snap fitting or a threaded connection. The second part has a bottom hole through which the cord extends, and which hole is provided with a conventional unloading or relief fitting.

From U.S. Pat. No. 6,317,054, a further alarm is known having a two-part housing. The housing is generally configured as an egg having a top and bottom wire inlet and outlet, and it is provided with cord guiding elements serving to allow the housing to be suspended in the cord at a position below the ceiling.

SUMMARY OF THE INVENTION

The present invention provides an alarm device comprising a housing adapted to be mounted adjacent to a ceiling, said housing including detector means and alarm means responsive to said detector means. The housing is adapted to replace existing ceiling rose fittings, but it is—in contrast to the device disclosed in GB 2 221 074 A—adapted to be carried by a cord extending from a ceiling so that fixation directly to the ceiling is avoided. Consequently, the alarm device according to the present invention is adapted to be maintained and fixed relative to a cord extending from the ceiling without having the alarm device connected to or fixed to the ceiling surface or to an electrical installation box or power outlet located at the ceiling.

In accordance with a first aspect of the invention, the housing comprises a hollow body having an upper circumferential edge and a lower circumferential edge, said hollow body having an inner surface facing an inner space defined within said hollow body, said lower circumferential edge defining an aperture to allow passage of a cord into said inner space; and a plurality of elastically bendable, elongate members, each having a length exceeding the width of said aperture and each having a proximal end and a distal end, the proximal ends of said elastically bendable, elongate members being located at said inner surface of said hollow body above said aperture, said plurality of elastically bendable, elongate members being orientated pointing to said aperture, and said distal ends of said plurality of elastically bendable, elongate members defining a free opening therebetween being smaller than said aperture, said distal ends of said plurality of elastically bendable, elongate members being adapted to engage the surface of a cord extending from a ceiling, and to carry said alarm device through said engagement, when said alarm device is mounted adjacent to said ceiling.

In accordance with a second aspect of the invention, the alarm device comprises a housing to be mounted adjacent to a ceiling and covering a connection of a single electrical cord to a ceiling surface without being connected to the ceiling surface or to any electrical box at the ceiling surface, said housing enclosing detector means and alarm means responsive to said detector means, said housing comprising a hollow body having an upper circumferential edge and a lower circumferential edge, said hollow body having an inner surface facing an inner space defined within said hollow body, said lower circumferential edge defining an aperture to allow passage of a cord into said inner space; and a plurality of elastically bendable, elongate members, each having a length exceeding the width of said aperture and each having a proximal end and a distal end, the proximal ends of said elastically bendable, elongate members being located at said inner surface of said hollow body above said aperture, said plurality of elastically bendable, elongate members being orientated pointing to said aperture, and said distal ends of said plurality of elastically bendable, elongate members defining a free opening therebetween, the opening being smaller than said aperture, said distal ends of said plurality of elastically bendable, elongate members being adapted to engage the surface of a cord extending from a ceiling, and to carry said alarm device through said engagement, when said alarm device is mounted adjacent to said ceiling.

The upper circumferential edge is intended to face the ceiling, and it will keep the housing in place, when carried by the cord of a swinging lamp, when the alarm device is mounted adjacent to a ceiling. The elastically bendable, elongate members, being adapted to engage the surface of a cord extending from a ceiling, may carry the alarm device by means of frictional resistance, provided that the resistance is sufficient to carry the weight of the housing enclosing detector means and alarm means. With modern electronic technology, detector means and alarm means of very low weight can be manufactured and will not add substantially to the weight of a housing manufactured in, for example, ABS plastic In order to increase the frictional resistance, it is preferred, according to the invention, that the hollow body is a symmetrical body having a central axis of symmetry, and that each of said elastically bendable, elongate members defines an angle less than 90°, such as an angle less than 80°, preferably less than 60°, or any suitable acute angle, relative to the axis of symmetry. To further increase the frictional resistance, it is furthermore preferred, according to the invention, that the elastically bendable, elongate members have a length constituting at least two times, preferably 2-5 times, more preferably 2-3 times, the width of the aperture through which a cord passes into the inner space of the housing. The free opening between the elongate members should be somewhat smaller than the cross section of the cord of a swinging lamp, and the smaller the free opening is relative to the cord, the higher the frictional resistance will be. Also the longer the elastically bendable, elongate members are relative to the distance from the proximal ends of the elongate members to the surface of the cord, the more the elongate members will bend and thus provide additional friction resistance. A constructor of ordinary skill in the art will be able to determine the optimum dimensions of the elastically bendable, elongate members to provide a frictional resistance that is sufficient to carry the housing enclosing detector means and alarm means, at the same time making it easy to push the housing upward on a cord to face a ceiling with the upper circumferential edge.

The placement of detector means and alarm means within the housing is preferably made symmetrical to the central axis of the housing so as to stabilize the alarm device adjacent to a ceiling. However, even if the detector means and alarm means are placed one-sided in the housing, the pre-stressing of the elastically bendable, elongate members, when bent, will push the upper circumferential edge of the housing toward the ceiling and thus keep it in place and prevent it from tilting.

According to the invention, the plurality of the elastically bendable, elongate members may be integrally connected to a separate annular body to be received within the inner space of hollow body and preferably snap-fitted into engagement with the inner surface. It is possible to manufacture the annular body and the hollow body from different plastic materials. For example, the annular body could be manufactured from PE or PP and the hollow body could be manufactured from ABS.

In the most preferred embodiment of the invention, the hollow body comprises two or more hollow body parts that are interconnected by means of co-operating latching means to form the hollow body. This will make it possible to mount the alarm device after the installation of a swinging lamp being connected to the AC power outlet in a ceiling. Thus, it has become possible to decide to install an alarm device long after a swinging lamp has been mounted in a room, and the alarm will look like a ceiling rose fitting to a person who has not installed the alarm device. This advantage cannot be obtained with a prior art smoke detector device of GB 2 221 074 A.

In the most preferred embodiment according to the invention, the hollow body is composed of two hollow body parts being releasably interconnected by means of co-operating latching means extending along respective side edges of each of the two hollow body parts. The two hollow body parts can be two identical shell parts having the co-operating latching means extending along a side edge extending in a direction parallel to the central axis of symmetry of the assembled hollow body. According to the invention each of the two hollow body parts may comprise at least one, preferably two, elastically bendable, elongate members, and the aperture to allow passage of a cord will be formed by interconnecting the two hollow body parts, whereby the alarm device is mounted on an existing cord extending from a ceiling by moving the two hollow body parts enclosing the cord laterally toward each other to engage the latching means. In this embodiment, one of the hollow body parts may enclose both the detector means and the alarm means as well as a battery for power supply. The alarm device can then be mounted around the cord of a swinging lamp by pressing the two body parts laterally against each other at eye level to engage the latching means, whereby the elastically bendable, elongate members defining a free opening therebetween will be pressed with their distal ends against the cord, and when the assembled housing is pushed upward against the ceiling, the elongate members will bend downward and provide a pre-stressing or distortion of the housing against the ceiling. By manufacturing the co-operating latching means releasably interconnected, it is possible to dismount the alarm device by pressing one of the two hollow body parts apart from the other hollow body part. By this means, a battery power supply can be replaced, and the detector means and/or alarm means can be cleaned. Also the housing as such can be cleaned.

An alarm device requiring a power supply can obtain such power supply from a DC 9V battery, from a rechargeable battery, or from 230/115V AC through a resistor. When the alarm device is a smoke detector device, it can be mounted adjacent to the ceiling of a room where there is a risk of a fire starting. Through the main-power supply of a building, the smoke detector device in one room can be connected to alarm devices in other rooms, so that alarm means can be activated in other rooms than the one where a fire has started.

In smoke detector devices, the smoke detector means will normally be either ionic alarms or optical alarms, both of which are activated by smoke rising from a fire. When the alarm device of the present invention is a smoke alarm device, care should therefore be taken that smoke can enter into the housing and reach the ionic or optical detector means. The gap between the cord and the circumferential edge of the cord aperture may be sufficient to allow a sufficient passage of smoke, but in order to improve the draught one or more further apertures may be provided in the housing between the upper circumferential edge and the lower circumferential edge.

Also cuts of other openings may be provided in the upper circumferential edge of the housing to facilitate a smoke activating the detector means.

As will be appreciated, the alarm device of the present invention can replace a ceiling rose fitting and thus act as a ceiling rose fitting, even if it is not being used as an alarm device. Therefore, in a separate aspect the invention also provides a housing for an alarm device, the housing being defined as described above, and further comprising means for mounting detector means and alarm means responsive to said detector means within an inner space defined within the hollow body. The means for mounting detector means and alarm means can easily be constructed by a person of ordinary skill in the art, who will know how to make sure that the alarm device can be activated in the surroundings where it is placed.

BRIEF DESCRIPTION OF THE DRAWINGS

The present invention is now to be further described with reference to the drawings in which.

DETAILED DESCRIPTION OF THE INVENTION

Figure 1:
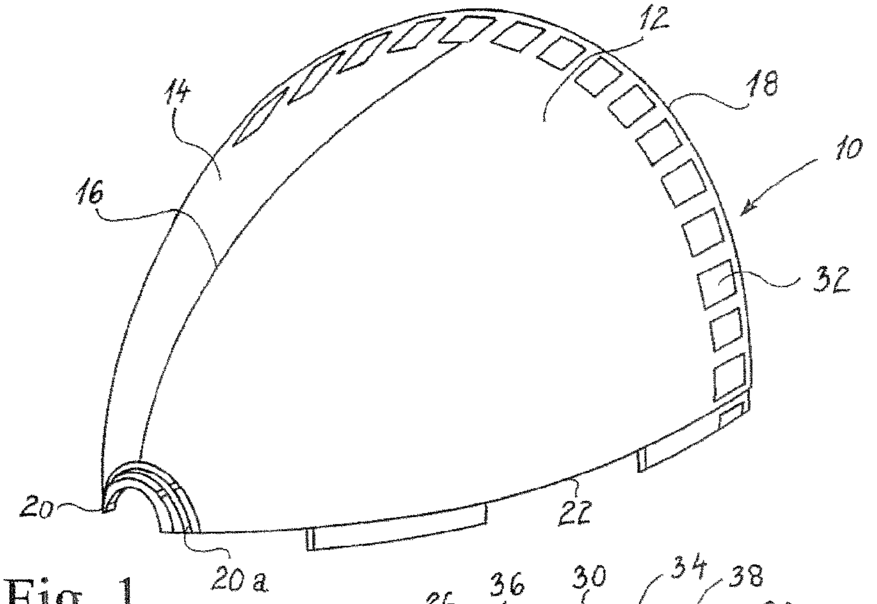
FIG. 1 is an overall perspective and schematic view illustrating a first and presently preferred embodiment of a hollow body part for an alarm device, constituting one half of a housing, and intended to be assembled with an identical second hollow body part, and disclosing the outer surface of a housing according to the invention.
Figure 2:
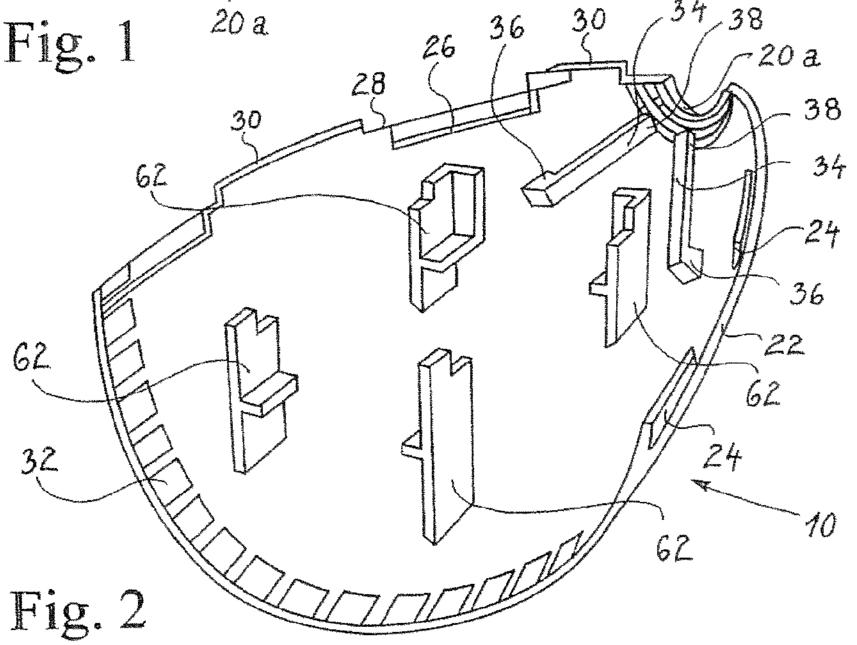
FIG. 2 is an overall perspective and schematic view similar to the view of FIG. 1, disclosing the interior of a hollow body part having means for mounting detector means and alarm means.

In FIGS. 1 and 2, a hollow body part 10 is shown, which component constitutes one half of an assembled housing for use as or in a first embodiment of an alarm device according to the present invention. In FIG. 1, the outer surface of the hollow body part 10 is disclosed, and in FIG. 2, the interior of the hollow body part 10 is disclosed. Basically, the body part 10 is a curved shell divided into two sections 12 and 14 by a separation line 16, which line serves the purpose of dividing the outer basically conical surface of the assembled housing into a total of four identical surface parts, which surface parts (such as the surface parts 12 and 14) are separated from the adjacent surface part by an edge of the body part 10 and the separation line 16.

The body part 10 defines a semicircular top edge 18 and a bottom semicircular edge 20. The top edge 18 has a dimension allowing the assembled housing composed of two identical body parts 10 to enclose a cable and/or connector, etc. within an inner space defined within the interior of the assembled housing when assembled from two identical body parts 10. The diameter of the lower semicircular edge 20 allows an electric cord or electric cable 40 (FIGS. 3*a*, 3*b*) to be introduced through the aperture defined by the two body parts when assembled into a composite housing having a bottom aperture defined by the two semicircular edges 20 of the two body parts. It is to be understood that the bottom aperture defined by the two bottom semicircular edges 20 of the two body parts 10, from which the composite housing is assembled, is substantially larger than the outer diameter of the electric cable or cord, allowing the cable or cord to be easily introduced into the bottom aperture of the assembly housing, and for allowing a gas to pass into the interior of the housing. A further aperture 20*a* above the lower circumferential edge 20 facilitates passage of a gas, such as smoke from a fire.

In FIG. 1, a first longitudinal edge interconnecting the top edge 18 and the bottom edge 20 is designated by the reference numeral 22, and as illustrated in FIG. 2, the first interconnecting edge 22 is provided with two inner arresting flanges 24 serving to fit into and latch with a pair of inner surface recesses 26 provided at an opposite second longitudinal interconnecting edge 28 of the body part 10. As is illustrated in FIG. 2, the opposite second interconnecting edge 28 is further provided with two additional flanges 30, serving the purpose of fitting into and latching with corresponding recesses (not shown) at the inner surface of the first interconnecting edge 22. In FIGS. 1 and 2, a number of cut-outs 32 are shown at the upper edge 18 of the body part 10, which cut-outs 32 serve the purpose of facilitating passage of a gas, such as smoke from a fire, through the housing.

Mounting elements 62 for fixing a box 60 (FIGS. 4*a*, 4*b*) containing alarm and detector means are fixed to the interior of body parts 10. A particular feature of the housing assembled from two body parts 10 relates to the safe and reliable fixation of the housing composed of two body parts relative to the electric cable or cord 40, the distant end of which is connected to an electrical lamp or similar appliance (not shown), and the proximal end of which is hidden within the inner chamber defined within the housing, as the proximal end is connected to the permanent installation of the room.

Figure 3A:
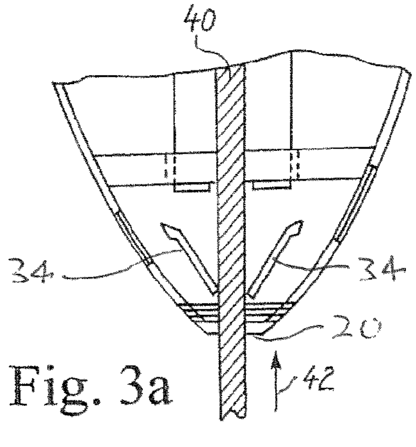
FIGS. 3*a* and 3*b* are schematic and partly cutaway views illustrating elongate members for carrying a housing having detector means and alarm means.
Figure 3B:
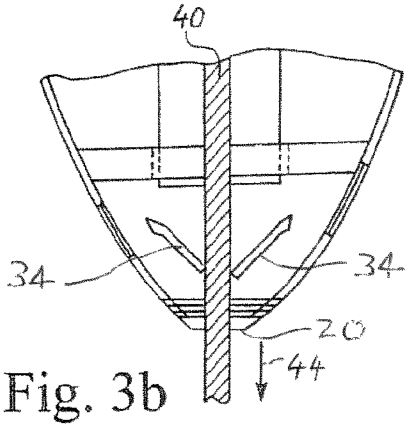

The safe and reliable fixation of the housing enclosing the detector and alarm means is established by means of a plurality of elongated and flexible arresting arms, two of which are shown in FIG. 2 and designated by the reference numeral 34. The arms 34 are mounted on posts 36 for positioning the arms in an acute angle relative to the cable or cord 40 which is guided through the bottom aperture defined by the two semicircular bottom edges 20 of the two body parts 10. The outer ends 38 of the arms 34 are sharp, as the arms have their outer ends 38 inclined relative to the longitudinal axis of the arms 34. A particular feature of the arms 34 is that the arms are orientated extending from the posts 36 toward the bottom edge 20 for allowing the assembled housing (as is illustrated in FIG. 3*a*) to slide along a cable or cord 40, when the assembled housing is pushed upward, as indicated by an arrow 42, as the arms 34 easily flex or bend outward. If it is attempted to move the housing downward relative to the cable or cord 40, as indicated in FIG. 3*b* and designated by an arrow 44, the flexible arms 34 function as barbs and press against or cut into the outer surface of the cable or cord 40 and prevent the housing from being intentionally or unintentionally moved downward.

The barb-like arms 34 have, as is illustrated in FIG. 2, a fairly large major dimension or length as compared to the width of the aperture defined by the bottom housing edge 20, and compared to the diameter of the cable or cord 40 that the barb functioning arms 34 are to arrest. The relatively great length of the arms 34 serves the purpose of positioning the arms 34 at an acute angle relative to the cable or cord 40, at the same time providing the needed flexibility for the arms 34 to perform the intended function of arresting barbs.

Figure 5:
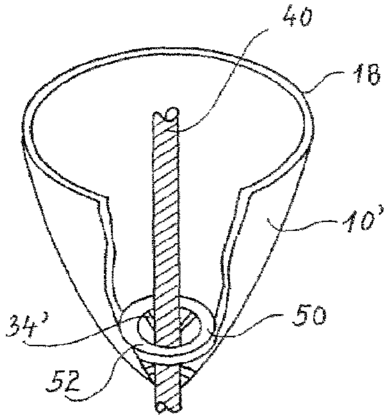
FIG. 5 is an overall perspective, schematic and partly cutaway view of a second embodiment of a housing according to the present invention, comprising an integral outer body or shell and an inner arresting ring.
Figure 6:
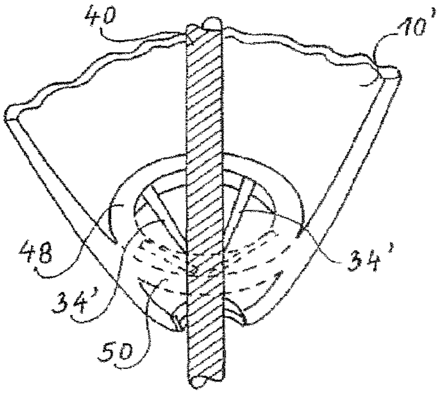
FIG. 6 is a perspective, schematic and partly cutaway view illustrating in greater detail the arresting ring of the second embodiment according to the present invention shown in FIG. 5.

The first and presently preferred embodiment of the housing for use as or according to the present invention described above with reference to FIGS. 1, 2, 3*a*, and 3*b* and being implemented as a two part structure may be modified in numerous ways, e.g., in accordance with the fittings described in inventor's non-published EP-A 0438025.1 and inventor's previously published international patent application WO 96/21123 to which reference is made, and which specifications are to be considered incorporated herein by reference as part of the present specification. According to an alternative embodiment of the housing according to the present invention, the outer shell of the housing is constituted by an integral unitary structure, as is illustrated in FIGS. 5 and 6, in which the shell is designated by the reference numeral 10'. In the description below, the components or elements identical to components or elements, respectively, described above, are designated by the same reference numerals, whereas components or elements serving the same purpose as components or elements, respectively, previously described, however, geometrically differing from the previously described components or elements, respectively, are designated by the same reference numerals, with, however, an added marking identifying the geometrical difference.

Whereas in the embodiment described above with reference to FIGS. 1, 2, 3*a* and 3*b*, the flexible barb-like arresting arms 34 characteristic of the present invention, are integrally included in the body part 10, the barb-like arresting arms of the embodiment shown in FIGS. 5 and 6 are included in a separate component 50 that is snap-fitted into the interior of the shell 10'. The component 50 is produced in a separate molding process, and it includes a ring-shaped body 52 from which a total of four arms 34' extend downward, serving the same purpose as the arms 34 described above with reference to FIGS. 3*a* and 3*b*.

In FIG. 6, the ring-shaped body 50 is shown in greater detail, illustrating the angular orientation of the arms 34' and further the snap-fitting of the ring-shaped body 50 to the inner surface of the fitting 10' behind a circumferential rim 48 at the inner surface of the shell 10'.

It is to be understood that the structure described above with reference to FIGS. 1, 2, 3*a* and 3*b* may be modified by the introduction of a separate arresting ring similar to the ring 50, and similarly, the integral arresting arms 34 described above with reference to the first embodiment shown in FIGS. 1 and 2 may be integrated into the unitary structure embodiment 10' shown in FIGS. 4 and 5. However, it is to be understood that the integration of the arms 34 into the embodiment shown in FIG. 4 may cause severe problems in the molding process and may necessitate the use of a highly advanced and elaborate injection molding tube. Therefore, the use of a separate arresting ring, such as the ring 50 shown in FIGS. 5 and 6, may be advantageous from the point of view of simplicity of manufacturing the fitting.

Furthermore, the use of a separate arresting component 50 rather than the integral arresting arms 34 allows the outer shell body 10' to be made from one material such as a fairly stiff and solid material, whereas the arresting ring 50 may be made from a softer and more flexible material, ensuring and fulfilling the requirements as to flexibility of the arresting arms. Relevant materials for the housing and components such as the arresting ring 50 of the fitting are plastic materials such as polyethylene (PE), polypropylene (PP), polyoxymethylene (POM) and acrylonitrile butadiene styrene (ABS). If a separate arresting ring, such as the ring 50 shown in FIGS. 5 and 6, is used, the outer conical shell may even be made from metal or metalized polymer, such as copper or aluminum or copper- or aluminum-plated plastic materials.

Figure 4A:
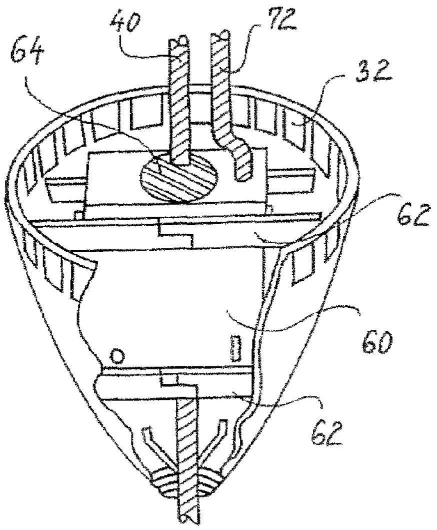
FIGS. 4*a* and 4*b* are schematic and partly cutaway views illustrating power supply and detector and alarm means in an alarm device of the invention.
Figure 4B:
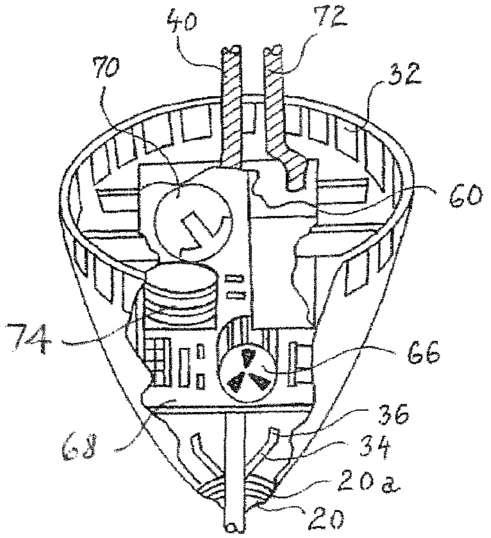

FIGS. 4*a* and 4*b* illustrate an alarm device according to the present invention embodied as a smoke detector alarm. FIG. 4*a* illustrates schematically a box 60 to be snap-fitted into the mounting elements 62 that are also shown in FIG. 2. The box 60 has an entrance (not shown) for smoke in a bottom part, and an opening 64 for a sound alarm (not shown). FIG. 4*b* shows the interior of the alarm device of FIG. 4*a* in more detail. Reference numeral 66 illustrates a smoke detector that is fixed to a printed circuit board 68, to which is also attached a piezo sounder 70. In this embodiment, power is supplied by three flat cell 3V batteries 74 that are connected in series. Such flat cells are advantageous for the power supply to take up a minimum of space. Alternatively, a 9V standard battery (not shown) can be used, or an external cord 72 from a 115/230V AC power supply may be connected through a resistance (not shown) to the circuit board 68 or to a rechargeable 9V battery (not shown).

Figure 7:
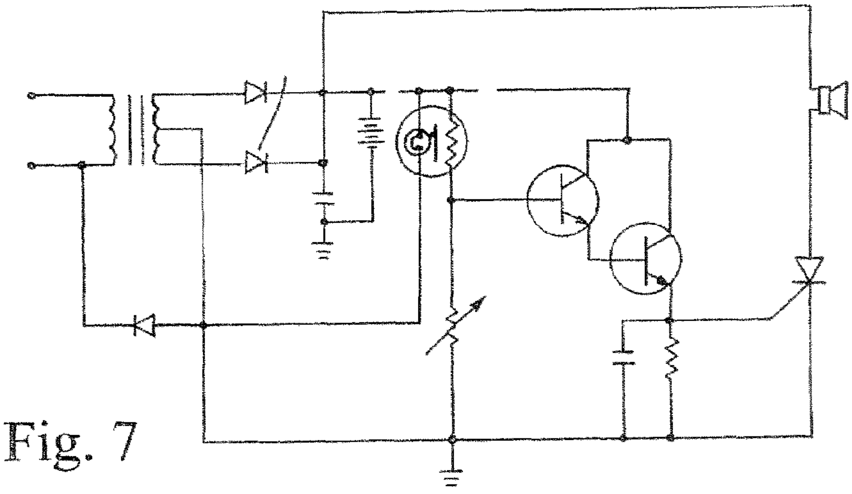
FIG. 7 is a schematic diagram of an exemplary smoke detector circuit disclosed in U.S. Pat. No. 4,090,178 and suitable for use in the present invention.

FIG. 7 illustrates an exemplary smoke detector circuit suitable for use in the present invention. Such a smoke detector circuit is disclosed in U.S. Pat. No. 4,090,178, which is hereby incorporated by reference. Other smoke detector circuits are well known in the art and can be designed after need by a person skilled in the art.

In the foregoing, the present invention has been described with reference to a cord extending from a ceiling, and which can carry an alarm device, so that fixation directly to a ceiling is avoided. However, as will be appreciated, any rod-like means, bar or other pin extending from a ceiling, whether or not enclosing an electrical cord, may be used to carry an alarm device according to the present invention.

Although the present invention has been described above with reference to a smoke alarm device, the principles of the present invention can be adapted in a similar way for other alarm devices, which it may be desirable to have placed in a housing imitating a ceiling rose fitting. A gas detector enclosed in a housing according to the invention may be used for sending an alarm signal, if there is an undesirable concentration of a gas, for example, chlorine or CO, in a room. Similarly, a burglar alarm sending and/or receiving radiation such as infra-red radiation can be enclosed in a housing according to the invention, which has been suitably designed with openings through which infrared radiation can pass, so that the alarm is activated if the infrared radiation is disturbed by an intruder. As will be appreciated, a burglar alarm enclosed in a housing according to the invention cannot be observed by an intruder who might otherwise try to interrupt the alarm.

Numerous other modifications and alterations are deducible in accordance with the teachings of the present invention, as will be evident to a person having ordinary skill in the art, and such variations and alterations are consequently to be considered part of the present invention as defined in the appending claims.

What is claimed is:

1. An alarm device housing adapted to be mounted adjacent to a ceiling, said housing being configured to enclose a detector and an alarm responsive to said detector, said housing comprising:

a hollow body having an upper circumferential edge and a lower circumferential edge, said hollow body having an inner surface facing an inner space defined within said hollow body, said lower circumferential edge defining an aperture to allow passage of a cord into said inner space; and a plurality of elastically bendable, elongate members, each having a length exceeding the width of said aperture and each having a proximal end and a distal end, the proximal ends of said elastically bendable, elongate members being located at said inner surface of said hollow body above said aperture, said plurality of elastically bendable, elongate members being oriented pointing to said aperture, and said distal ends of said plurality of elastically bendable, elongate members defining a free opening therebetween that is smaller than said aperture, said distal ends of said plurality of elastically bendable, elongate members being configured to engage the surface of a cord extending from a ceiling so as to support said alarm device when said alarm device housing is mounted adjacent to said ceiling.

2. The alarm device housing according to claim 1, wherein said hollow body is a symmetrical body having a central axis of symmetry, and wherein each of said elastically bendable, elongate members defines an acute angle relative to said axis of symmetry.

3. The alarm device housing according to claim 1, wherein said elastically bendable, elongate members are integrally connected to said hollow body.

4. The alarm device housing according to claim 1, wherein said plurality of elastically bendable, elongate members are integrally connected to a separate body configured to be fixed within said inner space of said hollow body.

5. The alarm device housing according to claim 1, wherein said free opening defines a minimum width constituting less than 90% of the width of said aperture.

6. The alarm device housing according to claim 1, wherein said elastically bendable, elongate members have a length constituting at least 2 times the width of said aperture.

7. The alarm device hot sing according to claim 1, wherein said elastically bendable, elongate members are located at a distance above said aperture at least equal to the length of said members.

8. The alarm device housing according to claim 7, wherein said distance constitutes at least 10% of the overall height of said housing.

9. The alarm device housing according to claim 1, wherein said hollow body comprises two or more hollow body parts which are interconnected by means of co-operating latching elements.

10. The alarm device housing according to claim 9, wherein said hollow body comprises two hollow body parts releasably interconnected by co-operating latching elements extending along respective side edges of each of said two hollow body parts.

11. The alarm device housing according to claim 10, wherein each of said two hollow body parts comprises at least one elastically bendable, elongate members, and wherein said aperture to allow passage of a cord is formed by interconnecting said two hollow body parts, whereby the alarm device is mountable on an existing cord extending from a ceiling by moving the two hollow body parts enclosing said cord laterally toward each other to engage said latching elements.

12. The alarm device housing of claim 1, further comprising at least one aperture located between said upper circumferential edge and said lower circumferential edge to facilitate a gas stream entering said hollow body.

13. The alarm device housing of claim 1, further comprising mounting elements in the hollow body configured for mounting a detector and an alarm responsive to said detector within the inner space defined within said hollow body.

14. An alarm device, comprising:

a detector;

an alarm responsive to the detector; and a housing containing the detector and the alarm and comprising:

a hollow body having an upper circumferential edge and a lower circumferential edge, said hollow body having an inner surface facing an inner space defined within said hollow body, said lower circumferential edge defining an aperture to allow passage of a cord into said inner space; and a plurality of elastically bendable, elongate members, each having a length exceeding the width of said aperture and each having a proximal end and a distal end, the proximal ends of said elastically bendable, elongate members being located at said inner surface of said hollow body above said aperture, said plurality of elastically bendable, elongate members being oriented pointing to said aperture, and said distal ends of said plurality of elastically bendable, elongate members defining a free opening therebetween that is smaller than said aperture, said distal ends of said plurality of elastically bendable, elongate members being configured to engage the surface of a cord extending from a ceiling so as to support said alarm device when said alarm device housing is mounted adjacent to said ceiling.

15. The alarm device according to claim 14, wherein said hollow body is a symmetrical body having a central axis of symmetry, and wherein each of said elastically bendable, elongate members defines an acute angle relative to said axis of symmetry.

16. The alarm device according to claim 14, wherein said plurality of elastically bendable, elongate members are integrally connected to said hollow body.

17. The alarm device according to claim 14, wherein said plurality of elastically bendable, elongate members are integrally connected to a separate body configured to be fixed within said inner space of said hollow body.

18. The alarm device according to claim 14, wherein said free opening defines a minimum width constituting less than 90% of the width of said aperture.

19. The alarm device according to claim 14, wherein said elastically bendable, elongate members have a length constituting at least 2 times the width of said aperture.

20. The alarm device according to claim 14, wherein said elastically bendable, elongate members are located at a distance above said aperture at least equal to the length of said members.

21. The alarm device according to claim 20, wherein said distance constitutes at least 10% of the overall height of said housing.

22. The alarm device according to claim 14, wherein said hollow body comprises two or more hollow body parts which are interconnected by means of co-operating latching elements.

23. The alarm device according to claim 22, wherein said hollow body comprises two hollow body parts releasably interconnected by co-operating latching elements extending along respective side edges of each of said two hollow body parts.

24. The alarm device according to claim 23, wherein each of said two hollow body parts comprises at least one elastically bendable, elongate members, and wherein said aperture to allow passage of a cord is formed by interconnecting said two hollow body parts, whereby the alarm device is mountable on an existing cord extending from a ceiling by moving the hollow body pens enclosing said cord laterally toward each other to engage said latching elements.

25. The alarm device according to any of claims 22-24, wherein the detector and the alarm are mounted in one of the hollow body parts.

26. The alarm device according to claim 14, further comprising at least one aperture located between said upper circumferential edge and said lower circumferential edge to facilitate a gas stream entering said hollow body.

* * * * *